United States Patent
Reba

(10) Patent No.: US 8,495,986 B2
(45) Date of Patent: Jul. 30, 2013

(54) RETROFIT INJECTOR MOUNT

(75) Inventor: Peter J. Reba, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 275 days.

(21) Appl. No.: 13/030,370

(22) Filed: Feb. 18, 2011

(65) Prior Publication Data

US 2012/0210982 A1    Aug. 23, 2012

(51) Int. Cl.
*F02M 61/14* (2006.01)
*F02M 61/16* (2006.01)

(52) U.S. Cl.
USPC .............................. 123/470; 60/295

(58) Field of Classification Search
USPC . 123/470, 195 A; 60/295, 272, 302; 285/420, 285/252, 253, 305, 330; 73/49.8, 46, 866.5
See application file for complete search history.

(56) References Cited

U.S. PATENT DOCUMENTS

| | | | |
|---|---|---|---|
| 3,905,623 A * | 9/1975 | Cassel | 285/382 |
| RE28,912 E | 7/1976 | Stade et al. | |
| 3,999,785 A | 12/1976 | Blakeley | |
| 4,312,526 A * | 1/1982 | Cassel | 285/419 |
| 4,558,891 A | 12/1985 | Wagner et al. | |
| 4,613,171 A | 9/1986 | Corcoran | |
| 4,655,035 A | 4/1987 | Sager, Jr. | |
| 5,010,626 A | 4/1991 | Dominguez | |
| 5,944,365 A | 8/1999 | Kizler et al. | |
| 5,971,001 A | 10/1999 | Andersson | |
| 6,340,059 B1 | 1/2002 | Bethea | |
| 6,557,908 B2 | 5/2003 | Houtschilt et al. | |
| 6,578,877 B1 | 6/2003 | Sundholm | |
| 6,672,139 B2 | 1/2004 | Pampinella | |
| 6,996,976 B2 | 2/2006 | Rumminger | |
| 7,458,619 B2 | 12/2008 | Cassel et al. | |
| 7,603,849 B2 | 10/2009 | Hanitzsch et al. | |
| 7,703,421 B2 | 4/2010 | Merchant et al. | |
| 7,770,937 B2 | 8/2010 | Ignaczak et al. | |
| 2003/0226412 A1 * | 12/2003 | Rumminger et al. | 73/866.5 |
| 2006/0192385 A1 | 8/2006 | Hiernard et al. | |

FOREIGN PATENT DOCUMENTS

| JP | 2005-264756 | 9/2005 |
|---|---|---|
| WO | WO2009/128969 | 10/2009 |

* cited by examiner

*Primary Examiner* — Mahmoud Gimie
(74) *Attorney, Agent, or Firm* — Harness, Dickey & Pierce, P.L.C.

(57) ABSTRACT

An injector mount clamp for coupling an injector of an exhaust gas treatment system to an exhaust conduit of an engine while the conduit is in an installed position includes a resilient monolithic clamp body having an aperture extending therethrough and being shaped as a split collar having a first end spaced apart from a second end a distance allowing the clamp body to be transversely moved relative to an exhaust flow direction to a position circumferentially surrounding the exhaust conduit. An injector mounting boss is disposed on the clamp body and defines a passage that fluidly communicates with the aperture of the clamp body. The mounting boss has a mounting face configured to oppose the injector.

20 Claims, 6 Drawing Sheets

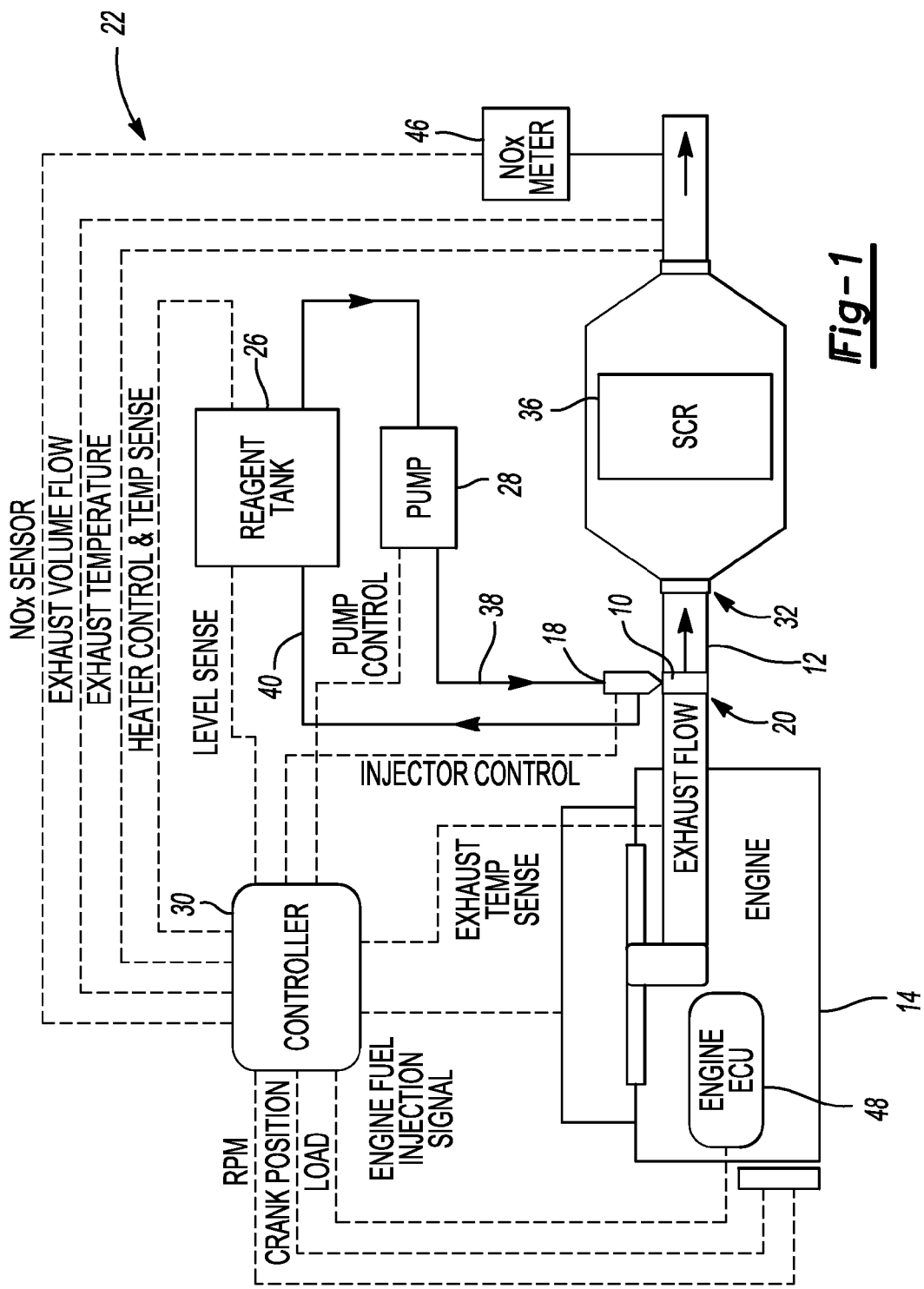

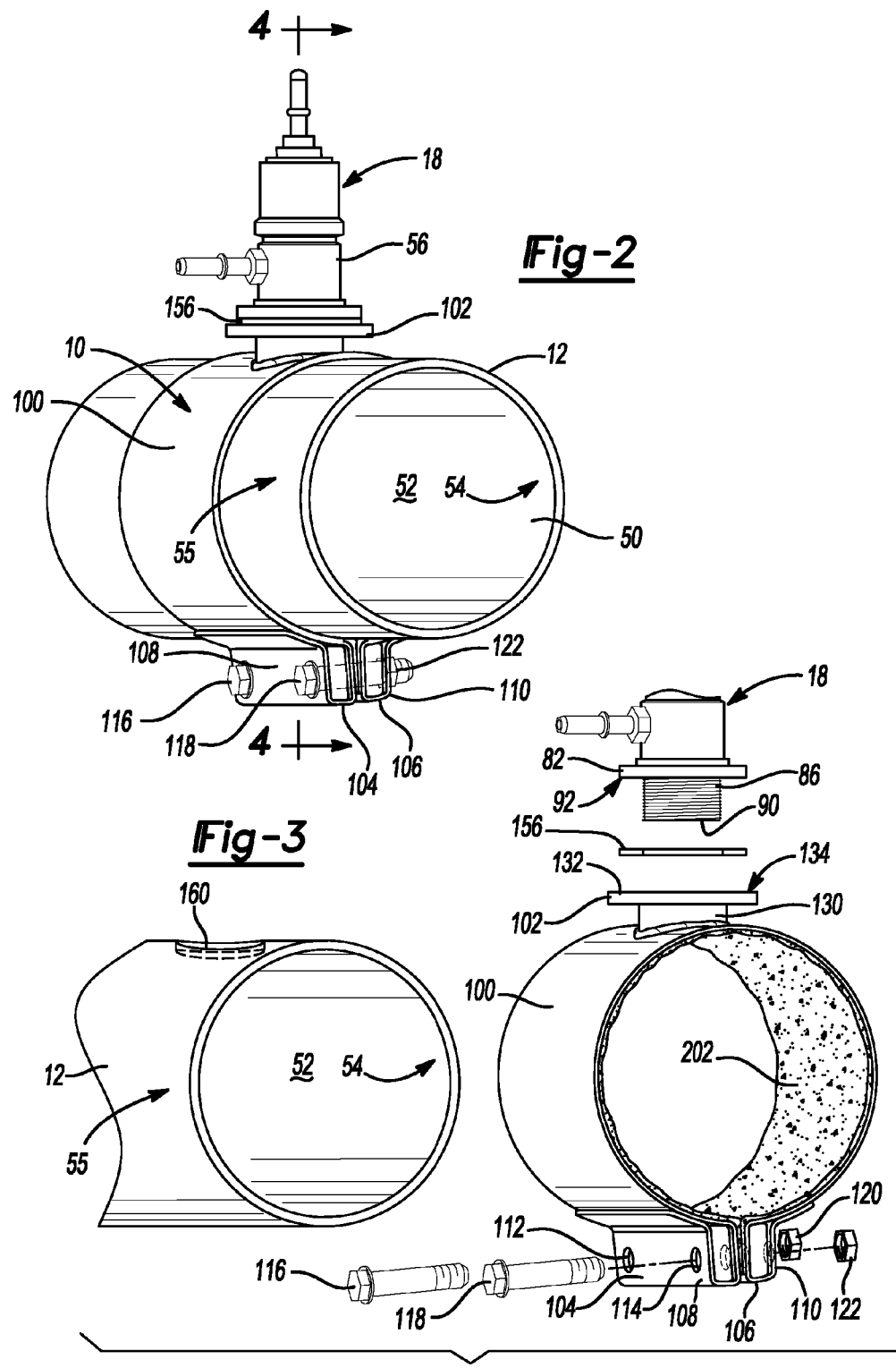

RETROFIT INJECTOR MOUNT

FIELD

The present disclosure relates to injector systems and, more particularly, relates to a retrofit injector mount clamp and related method for coupling an injector of an injector system to an exhaust conduit of an engine.

BACKGROUND

This section provides background information related to the present disclosure which is not necessarily prior art.

Lean burn engines provide improved fuel efficiency by operating with an excess of oxygen over the amount necessary for complete combustion of the fuel. Such engines are said to run "lean" or a "lean mixture". However, this increase in fuel economy is offset by undesired pollution emissions, specifically in the form of oxides of nitrogen (NOx).

One method used to reduce NOx emissions from lean burn internal combustion engines is known as selective catalytic reduction (SCR). SCR, when used, for example, to reduce NOx emissions from a diesel engine, involves injecting an atomized reagent into the exhaust stream of the engine in relation to one or more selected engine operational parameters, such as exhaust gas temperature, engine rpm or engine load as measured by engine fuel flow, turbo boost pressure or exhaust NOx mass flow. The reagent/exhaust gas mixture is passed through a reactor containing a catalyst, such as for example, activated carbon or metals, such as platinum, vanadium or tungsten, which are capable of reducing the NOx concentration in the presence of the reagent.

An aqueous urea solution is known to be an effective reagent in SCR systems for diesel engines. Several current injector systems include mounting arrangements that position the injector a predetermined distance away from the exhaust pipe. Some injector mounting arrangements may be referred to as a "dog house" or "stand-off" style. Other current injector systems include mounting blocks that have cannulated projections that extend into the exhaust pipe. Such mounting blocks have injectors arranged thereon for communicating a solution through the mounting block and cannulated projection into the exhaust pipe. In many examples, such mounting arrangements may be difficult to quickly and accurately connect to an existing exhaust pipe, such as on a vehicle in the field.

SUMMARY

This section provides a general summary of the disclosure, and is not a comprehensive disclosure of its full scope or all of its features.

An injector mount clamp for coupling an injector of an exhaust gas treatment system to an exhaust conduit of an engine while the conduit is in an installed position includes a resilient monolithic clamp body having an aperture extending therethrough and being shaped as a split collar having a first end spaced apart from a second end a distance allowing the clamp body to be transversely moved relative to an exhaust flow direction to a position circumferentially surrounding the exhaust conduit. An injector mounting boss is disposed on the clamp body and defines a passage that fluidly communicates with the aperture of the clamp body. The mounting boss has a mounting face configured to oppose the injector.

According to other features, the first and second ends each have a mounting ear extending therefrom. The mounting ears have complementary engaging surfaces that are configured to engage each other in the installed position. The passage of the cylindrical body portion is threaded and configured to threadably mate with complementary threads on the injector.

According to yet other features, the injector mount clamp further comprises insulating material that is configured to be located intermediate the clamp body and the exhaust conduit in the install position. The injector mounting boss is welded to the clamp body and formed of stainless steel. The clamp body is configured to allow the clamp body to deflect radially outwardly to accommodate the exhaust conduit during an installation step and subsequently deflect radially inwardly to a position where the clamp body becomes fixed to the conduit.

A method for retrofitting an injector of an exhaust gas treatment system to an exhaust conduit of an engine includes forming an opening in the exhaust conduit. A clamp body of an injector mount clamp is advanced around the exhaust conduit in a direction transverse to the flow of exhaust through the conduit. The clamp body has a first end and a second end as well as an injector mounting boss disposed thereon. The mounting boss defines a passage in fluid communication with the opening in the exhaust conduit. A fastener is advanced through apertures in complementary ears extending from the first and second ends of the clamp body. The fastener is tightened relative to the clamp body to move the first and second ends of the clamp body closer to each other and inhibit slidable movement of the clamp body along the exhaust conduit. An insertion end of the injector is advanced into the injector mounting boss until the injector engages the exhaust conduit.

According to other features, advancing the clamp body comprises radially expanding the clamp body until the ears extend beyond an outer diameter of the exhaust conduit. Tightening the fastener causes the clamp body to radially contract to a profile that conforms to the exhaust conduit. Insulating material is placed intermediate the clamp body and the exhaust conduit. Advancing the insertion end of the injector comprises threadably advancing the insertion end of the injector along complementary threads formed in the cylindrical body portion. The insertion end of the injector is advanced until the terminal end of the injector engages the exhaust conduit, without extending beyond an inner circumference of the exhaust conduit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows a schematic diagram of an exemplary internal combustion engine with an emissions control system using an injector mount clamp according to the present teachings;

FIG. 2 is a perspective view of the injector mount clamp and injector secured to an exhaust conduit in an installed position;

FIG. 3 is an exploded perspective view of the injector mount clamp, injector and exhaust conduit of FIG. 2;

Figure 6:
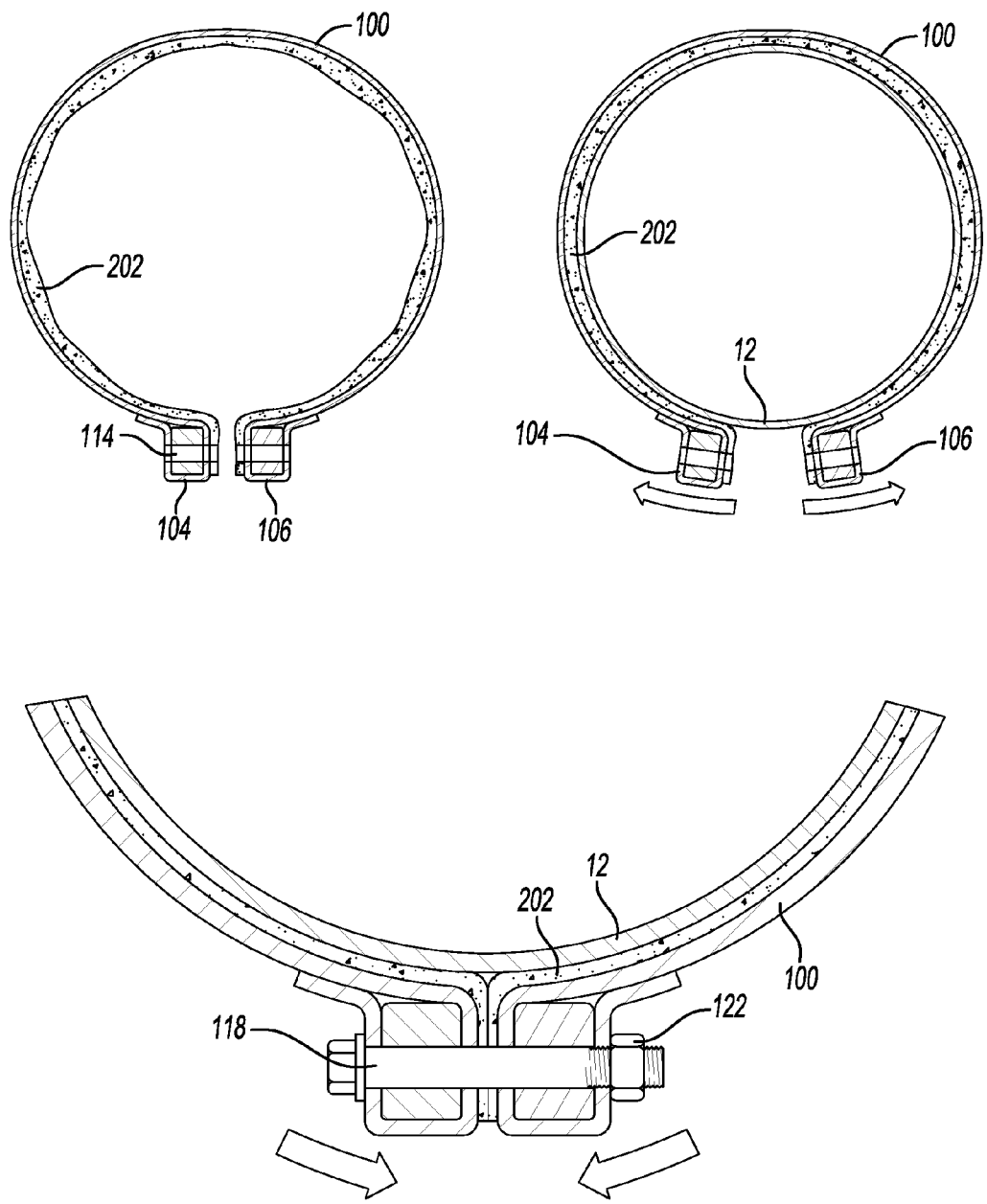
Figure 7:
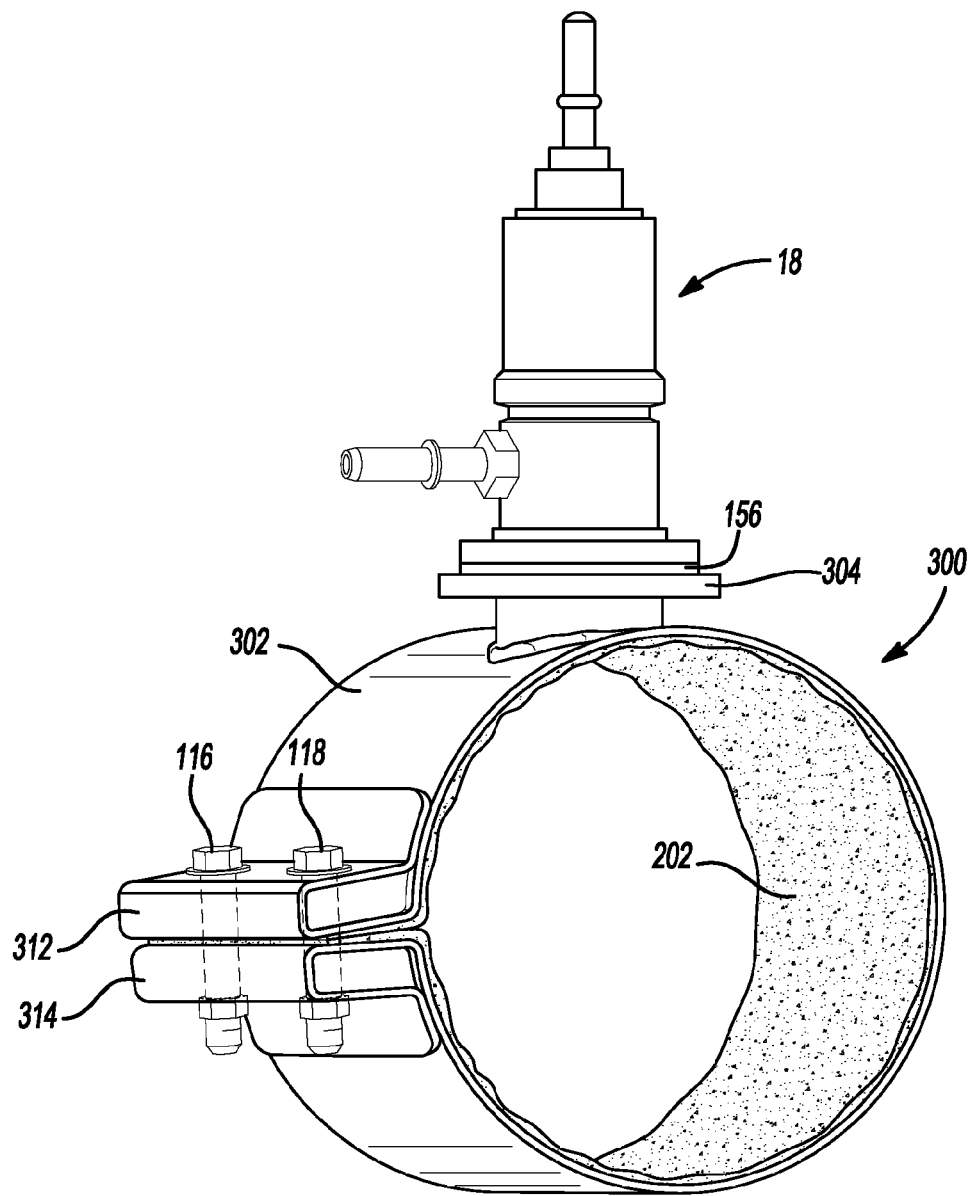

FIG. 6 is an exemplary installation sequence where the injector mount clamp is initially radially expanded to accommodate an outer diameter of the exhaust conduit and subsequently radially contracted to conform to the exhaust conduit by way of a fastener; and FIG. 7 is an injector mount clamp constructed in accordance to additional features of the present teachings and shown with an injector mount coupled thereto.

Corresponding reference numerals indicate corresponding parts throughout the several views of the drawings.

DETAILED DESCRIPTION

Example embodiments will now be described more fully with reference to the accompanying drawings.

With initial reference to FIGS. 1 and 2, an injector mount clamp constructed in accordance to the present teachings is shown and generally identified at reference numeral 10. The injector mount clamp 10 is shown operatively coupled to an exhaust conduit 12 of an engine 14. The injector mount clamp 10 of the present teachings can be configured to couple an injector 18 of an exhaust gas treatment assembly 20 to the exhaust conduit 12. As will become appreciated by the following description, the injector mount clamp 10 can be particularly suited for being retrofit onto an existing exhaust conduit 12. Prior to describing the injector mount clamp 10, an exemplary pollution control system 22 incorporating the exhaust gas treatment assembly 20 will initially be described.

The pollution control system 22 is configured to reduce NOx emissions from the exhaust conduit 12 of the engine 14. In the exemplary configuration, the engine 14 is a diesel engine. As denoted in FIG. 1, solid lines between the elements of the pollution control system 22 denote fluid lines for reagent and dashed lines denote electrical connections. The pollution control system 22 of the present teachings may include a reagent tank 26 for holding the reagent and a delivery module 28 for delivering the reagent from the tank 26. The reagent may be a urea solution, a hydrocarbon, an alkyl-ester, alcohol, an organic compound, water, or the like and can be a blend or combination thereof. It should also be appreciated that one or more reagents can be available in the system and can be used singly or in combination. The tank 26 and delivery module 28 may form an integrated reagent tank/delivery module. Also provided as part of the pollution control system 22 is an electronic injection controller 30, the reagent injector 18, and an exhaust system 32. The exhaust system 32 includes the exhaust conduit 12 that provides an exhaust stream to at least one catalyst bed 36.

The delivery module 28 may comprise a pump that supplies reagent from the tank 26 via a supply line 38. The reagent tank 26 may be polypropylene, epoxy coated carbon steel, PVC, or stainless steel and sized according to the application (e.g., vehicle size, intended use of the vehicle, and the like). A pressure regulator (not shown) may be provided to maintain the system at predetermined pressure set points (e.g., relatively low pressures of approximately 60-80 psi, or in some embodiments a pressure of approximately 60-150 psi) and may be located in a return line 40 from the injector 18. A pressure sensor may be provided in the supply line 38 leading to the reagent injector 18. The pollution control system 22 may also incorporate various freeze protection strategies to thaw frozen reagent or to prevent the reagent from freezing. During system operation, regardless of whether or not the injector is releasing reagent into the exhaust gases, reagent may be circulated continuously between the tank 26 and the reagent injector 18 to cool the reagent injector 18 and to minimize the dwell time of the reagent in the injector, so that the reagent remains cool. Continuous reagent circulation may be necessary for temperature-sensitive reagents, such as aqueous urea, which tend to solidify upon exposure to elevated temperatures of 300° C. to 650° C. as would be experienced in an engine exhaust system. Furthermore, in some examples, it may be desirable to keep the reagent mixture below 140° C. and preferably in a lower operating range between 5° C. and 95° C. to insure that solidification of the reagent is prevented. Solidified reagent, if allowed to form, may foul the moving parts and openings of the injector 18.

The amount of reagent required may vary with load, engine rpm, exhaust speed, exhaust gas temperature, exhaust gas flow, engine fuel, injection timing, desired NOx reduction, barometric pressure, relative humidity, EGR rate and engine coolant temperature. A NOx sensor or meter 46 is positioned downstream from the catalyst bed 36. The NOx sensor 46 is operable to output a signal indicative of the exhaust NOx content to a controller 30. All or some of the engine operating parameters may be supplied from an engine control unit 48 via the engine/vehicle databus to the reagent electronic injection controller 30. The reagent electronic injection controller 30 could also be included as part of the engine control unit 48. Exhaust gas temperature, exhaust gas flow and exhaust back pressure and other vehicle operating parameters may be measured by respective sensors, not specifically shown.

With particular reference now to FIGS. 1-4, the exhaust conduit 12 includes a substantially cylindrical tube 50 that defines an exhaust passageway 52. The cylindrical tube 50 further includes an inner surface 54 and an outer surface 55.

With specific reference now to FIG. 4, additional features of the injector 18 will be described in greater detail. The injector 18 includes an injector body 56. The injector body 56 defines a cylindrical chamber 60 that receives an axially translatable valve member 62. The injector body 56 includes an exit orifice 66 at a discharge location for the injected reagent. A valve seat 70 is formed proximate the exit orifice 66. The valve seat 70 is selectively engaged by the valve member 62 to control reagent injection into the exhaust gas flow path. The valve member 62 is translatable along an axis of reagent injection 76.

An adapter 80 is fixed to the injector body 56 and includes a radially outwardly extending flange 82 and a cylindrical male extension portion 86. The cylindrical male extension portion 86 can define an outer diameter 87 having outer threads 88 and can extend to a terminal end 90. The injector flange 82 can define an outer diameter 91 and includes an injector flange face 92 (FIG. 3). The outer diameter 91 of the injector flange 82 is larger than the outer diameter 87 of the cylindrical male extension portion 86.

Figure 4:
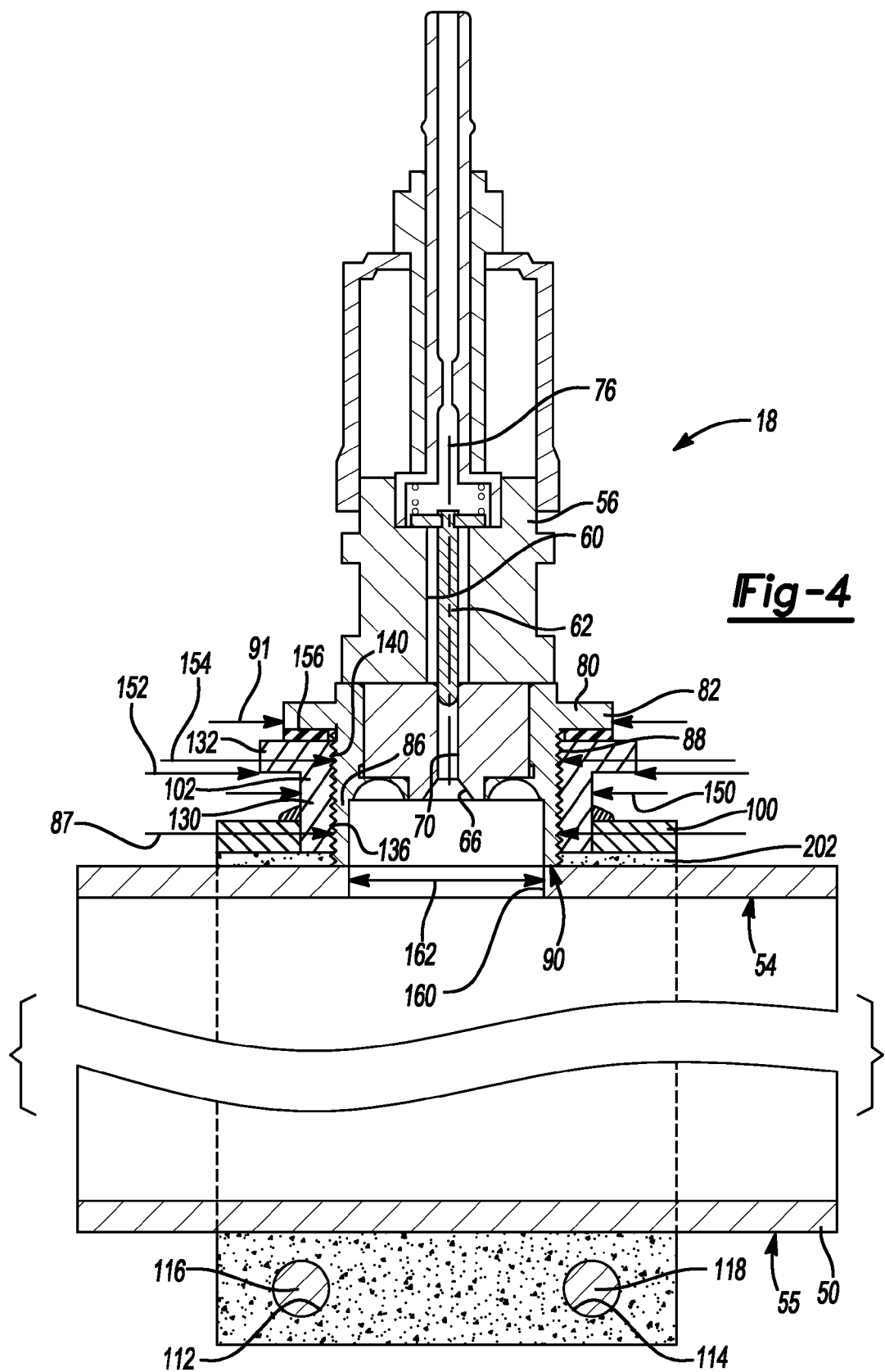
FIG. 4 is a cross-sectional view of the injector mount clamp, injector and exhaust conduit taken along lines 4-4 of FIG. 2.

With reference now to FIGS. 2-4, the injector mount clamp 10 will be described in greater detail. The injector mount clamp 10 generally includes a clamp body 100 and an injector mounting boss 102. The clamp body 100 generally includes a thin-walled cylindrically shaped band of material that extends from a first end 104 to a second end 106. The injector mount clamp 10 is formed of metallic material, such as but not limited to, stainless steel. First and second mounting ears 108 and 110 are formed at the ends 104 and 106, respectively. The mounting ears 108 and 110 collectively define complementary passages 112, 114 therein. The passages 112 and 114 can be configured to align and receive fasteners 116 and 118, respectively therein. The fasteners 116 and 118 can be threaded for receiving nuts 120 and 122 in an assembled position (FIG. 2). Other configurations are contemplated. For example, one or more than two fasteners may be incorporated. Additionally or alternatively, other securing members may be employed, such as clips, rivets, screw-clamps and the like.

The injector mounting boss 102 generally includes a cylindrical body portion 130 and an injector mounting boss flange 132 extending therefrom. The injector mounting boss flange 132 includes an outer mounting face 134 (FIG. 3). In one example, the injector mounting boss 102 is welded to the clamp body 100. The injector mounting boss 102 is pre-welded to clamp body 100 such that a retro-fit installer need not couple the injector mounting boss 102 to the clamp body.

The injector mounting boss 102 can define a female receiving portion or passage 136 that is configured to receive the cylindrical male extension portion 86 of the injector 18. In this regard, the female receiving portion 136 can include inner threads 140 that are complementary to the outer threads 88 of the injector 18. According to one configuration, the cylindrical body portion can define an outer diameter 150. The injector mounting boss flange 132 can define an outer diameter 152. The outer diameter 152 of the injector mounting boss flange 132 is greater than the outer diameter of the cylindrical body portion 130. The cylindrical body portion 130 can define an inner diameter 154 that is sized to receive the cylindrical male extension portion 86 in an assembled position (FIG. 4). Moreover, and as will be described herein, the outer mounting face 134 of the injector mounting boss flange 132 is configured to oppose the injector flange face 92 of the injector flange 82 in the assembled position. A gasket 156 can be disposed between the injector flange 82 and the injector mounting boss flange 132. The gasket 156 may be formed of elastomeric material. According to one example, the terminal end 90 of the cylindrical male extension portion 86 of the injector 18 can engage the outer surface 55 of the cylindrical tube 50. In addition, the injector mount clamp 10 can be arranged at a location on the cylindrical tube 50, such that the passage 136 of the cylindrical body portion 130 substantially aligns with an opening 160 formed through the cylindrical tube 50.

In one example, the opening 160 can define an inner diameter 162. The inner diameter 162 of the opening 160 may be less than the outer diameter 87 of the cylindrical male extension portion 86. Because the opening 160 is less than the outer diameter 87 of the male extension portion 86, the terminal end 90 can be configured to engage the outer surface 55. Such engagement may also coincide with engagement of the outer mounting face 134, gasket 156 and the injector flange face 92. It can be appreciated that in other configurations, the outer diameter 87 of the male extension portion 86 may be less than the inner diameter 162 of the opening 160, such that the terminal end 90 extends to a position between the inner surface 54 and outer surface 55 of the cylindrical tube 50. It can be appreciated, however, that the terminal end 90 does not extend inboard (beyond) the inner surface 54 in the installed position.

Figure 5:
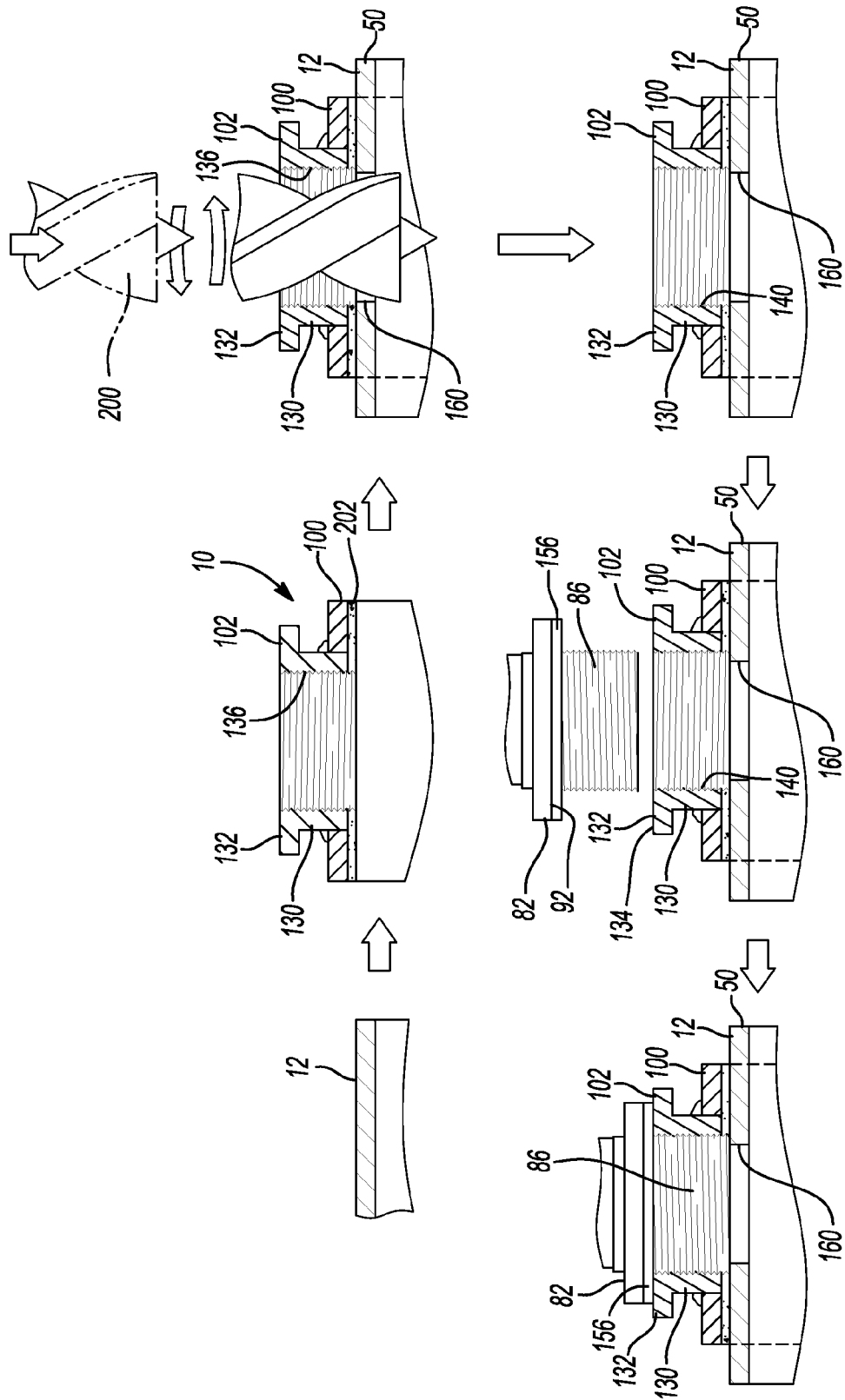
FIG. 5 is an exemplary installation sequence for retrofitting an existing exhaust conduit with an injector.

With specific reference now to FIG. 5, an exemplary sequence for retrofitting the injector mount clamp 10 onto an existing exhaust conduit 12 according to one example of the present teachings will be described. At the outset, it can be appreciated that the injector mount clamp 10 may be particularly suited for retrofitting an injector 18, such as associated with the exhaust gas treatment assembly 20 described above. In this regard, an installer can observe the existing exhaust conduit 12 and identify a preferred location therealong.

According to one example, the injector mount clamp 10 can be located at a desired location on the exhaust conduit 12 while a cutting tool 200 is guided through the passage 136 to prepare the opening 160 through the cylindrical tube 50 of the exhaust conduit 12. It can be appreciated that other methods may be carried out. For example, an installer may wish to alternatively mark a desired position of the injector mount clamp 10, such as with a marking instrument (not particularly shown) and move the injector mount clamp 10 away from the identified location. The cutting tool 200 can then subsequently be used to prepare the opening 160 through the cylindrical tube 50 of the exhaust conduit 12. While the cutting tool 200 is shown as a drill bit, other tools may be used, such as a punch for example.

With the opening 160 prepared through the cylindrical tube 50 of the exhaust conduit 12, the injector mount clamp 10 can be coupled to the cylindrical tube 50 at a location, such that the female receiving portion 136 of the injector mounting boss 102 fluidly aligns with the opening 160. One specific example of coupling the injector mount clamp 10 to the cylindrical tube 50 of the exhaust conduit 12 is shown in FIG. 6 and described in detail below. Once the injector mount clamp 10 has been secured to the cylindrical tube 50 of the exhaust conduit 12, the injector 18 can be coupled to the injector mounting boss 102. More particularly, the male extension portion 86 can be advanced into the receiving portion 136 of the cylindrical body portion 130 of the injector mounting boss 102. In the specific example provided, the outer threads 88 of the injector 18 are advanced along the inner threads 140 of the cylindrical body portion 130 of the injector mounting boss 102. In one example, the male extension portion 86 is advanced until it engages the cylindrical tube 50 of the exhaust conduit 12. At this time, the gasket 156 can be engaged and/or compressed between the injector flange face 92 and the outer mounting face 134 of the injector mounting boss 102.

With reference now to FIG. 6, one exemplary sequence of advancing the injector mount clamp 10 onto the cylindrical tube 50 of the exhaust conduit 12 will be described. Initially, the clamp body 100 of the injector mount clamp 10 can be radially expanded by advancing the ears 108 and 110 away from each other until the clamp body 100 has been radially opened sufficiently to advance around the cylindrical tube 50. The clamp body 100 can then be transversely moved relative to the exhaust flow direction to circumscribe the conduit. The clamp body is then radially contracted around the cylindrical tube 50 of the exhaust conduit 12 and the fasteners 116 and 118 advanced through the respective passages 112 and 114. The nuts 120 and 122 can then be threadably advanced onto the fasteners 116 and 118 to secure the injector mount clamp 10 onto the cylindrical tube 50. In the installed position, an insulting material 202 is located intermediate the clamp body 100 of the injector mount clamp 10 and the cylindrical tube 50 of the exhaust conduit 12. The insulating material 202 can thermally insulate the clamp body 100 from the cylindrical tube 50 of the exhaust conduit 12. It will be appreciated that while the ears 108 and 110 are illustrated as touching in the installed position, they may also be spaced away from each other. Furthermore, it is contemplated that a plurality of injector mount clamps may be provided for retrofitting with exhaust conduits of various diameters. For example, injector mount clamps may be sized for mounting to exhaust conduits of 2, 2.5, 3, 3.5, 4, 5 and 6 inches. Other sizes are contemplated.

FIG. 7 illustrates an injector mount clamp 300 constructed in accordance to additional features of the present teachings. The injector mount clamp 300 includes a generally cylindrical clamp body 302 and an injector mounting boss 304. Unless described otherwise herein, the injector mount clamp 300 is constructed similarly to the injector mount clamp 10 however the cylindrical clamp body 302 includes mounting ears 312 and 314 that are generally arranged at a different location as compared to the embodiment shown in FIG. 3. In this regard, the mounting ears 312 and 314 are shown at a location on the cylindrical clamp body 302 generally closer to the injector mounting boss 304 as compared to the embodiment shown in FIG. 2. In this regard, it may be desirable to provide mounting ears 312 and 314 that are positioned differently on the injector mount clamp 10 in applications where access to the fasteners 116 and 118, as well as the injector mounting boss 304 is more favorable.

It should be understood that although the present teachings may be described for retrofitting an exhaust in connection with diesel engines and the reduction of NOx emissions, the retrofit injector mount clamp 10 of the present teachings can be used in connection with any one of a number of exhaust stream, such as by way of non-limiting example, those from diesel, gasoline, turbine, fuel cell, jet, or any other power source outputting a discharge stream. Moreover, the present teachings may be used in connection with the reduction of any one of a number of undesired emissions. For example, injection of hydrocarbons for the regeneration of diesel particulate filters is also within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An injector mount clamp for coupling an injector of an exhaust gas treatment system to an exhaust conduit of an engine while the conduit is in an installed position, the injector mount clamp comprising:
 a resilient monolithic clamp body having an aperture extending therethrough and being shaped as a split collar having a first end spaced apart from a second end a distance allowing the clamp body to be transversely moved relative to an exhaust flow direction to a position circumferentially surrounding the exhaust conduit;
 an insulating material coupled to an inner surface of the clamp body to space apart the inner surface from the conduit and thermally insulate the clamp body from the conduit; and
 an injector mounting boss disposed on the clamp body and defining a passage that fluidly communicates with the aperture of the clamp body, the mounting boss having a mounting face configured to oppose the injector.

2. The injector mount clamp of claim 1, wherein the first and second ends each include a mounting ear extending therefrom, the mounting ears defining at least one complementary passage therethrough, the clamp including a fastener for moving the mounting ears closer to one another and reducing an inner diameter of the split collar.

3. The injector mount clamp of claim 2, wherein the mounting ears include complementary engaging surfaces that are configured to engage the conduit during the transverse movement.

4. The injector mount clamp of claim 1, wherein the passage of the boss is threaded and configured to threadably mate with complementary threads on the injector.

5. The injector mount clamp of claim 1, wherein the boss protrudes only radially outwardly from the clamp body.

6. The injector mount clamp of claim 1, wherein the injector mounting boss is welded to the clamp body.

7. The injector mount clamp of claim 6, wherein the clamp body is formed of stainless steel.

8. The injector mount clamp of claim 2, wherein the distance between the first and second ends is less than an outer diameter of the conduit such that the clamp body deflects radially outwardly to accommodate the exhaust conduit during an installation step and subsequently deflects radially inwardly to a position where the clamp body becomes fixed to the conduit.

9. An injector mount clamp for coupling an injector of an exhaust gas treatment system to an exhaust conduit of an engine while the conduit is in an installed position, the exhaust conduit having an opening, the injector mount clamp comprising:
 a clamp body having a first end and a second end, the clamp body having a generally circumferential profile configured to conform to the exhaust conduit, the clamp body having a thickness that defines an aperture;
 an insulating material configured to be located intermediate the clamp body and the exhaust conduit when the clamp is at an installed position, the insulating material uninterruptedly circumferentially extending from the first end of the clamp body to the second end of the clamp body to space apart the clamp body from the exhaust conduit; and
 an injector mounting boss disposed on the clamp body, the injector mounting boss having a cylindrical body portion and a flange, the cylindrical body portion defining a passage that fluidly communicates with the aperture of the clamp body, the flange having an outer mounting face configured to oppose a complementary flange on the injector such that a terminal end of the injector is in fluid communication with the exhaust conduit, without extending beyond an inner circumference of the exhaust conduit when in an installed position.

10. The injector mount clamp of claim 9, wherein the cylindrical body portion has a first inner diameter and the opening in the exhaust conduit has a second inner diameter, the second inner diameter being less than the first inner diameter.

11. The injector mount clamp of claim 9, wherein the first and second ends each have mounting ears extending therefrom, the mounting ears having complementary engaging surfaces that are configured to engage in the installed position.

12. The injector mount clamp of claim 11, wherein the mounting ears define at least one complementary passage therethrough configured to accept a fastener in the installed position.

13. The injector mount clamp of claim 12, wherein the passage of the cylindrical body portion is threaded and configured to threadably mate with complementary threads on the injector.

14. The injector mount clamp of claim 9, wherein the boss protrudes only radially outwardly from the clamp body.

15. The injector mount clamp of claim 11, wherein the thickness of the clamp body is configured to allow the clamp body to deflect radially outwardly to accommodate the exhaust conduit during an installation step and subsequently deflect radially inwardly to a position where the clamp body becomes fixed to the conduit.

16. A method for retrofitting an injector of an exhaust gas treatment system to an exhaust conduit of an engine, the method comprising:
 forming an opening in the exhaust conduit;
 advancing a clamp body of an injector mount clamp around the exhaust conduit in a direction transverse to the flow of exhaust through the conduit, the clamp body having a first end and a second end as well as an injector mounting boss disposed thereon, the mounting boss defining a passage in fluid communication with the opening in the exhaust conduit;

advancing a fastener through apertures formed in complementary ears extending from the first and second ends of the clamp body;

placing insulating material intermediate the clamp body and the exhaust conduit to space apart the clamp body from the exhaust conduit and reduce heat transfer therebetween;

tightening the fastener relative to the clamp body to move the first and second ends of the clamp body closer to each other and inhibit slidable movement of the clamp body along the exhaust conduit; and advancing an insertion end of the injector into the injector mounting boss until the injector engages the exhaust conduit.

17. The method of claim 16, wherein advancing the clamp body comprises radially expanding the clamp body until the ears extend beyond an outer diameter of the exhaust conduit and wherein tightening the fastener causes the clamp body to radially contract to a profile that conforms to the exhaust conduit.

18. The method of claim 16, wherein advancing the insertion end of the injector comprises threadably advancing the insertion end of the injector along complementary threads formed in the mounting boss.

19. The method of claim 18, further comprising terminating the advancing such that a terminal end of the injector engages the exhaust conduit, without extending beyond an inner circumference of the exhaust conduit.

20. The method of claim 16, wherein forming the opening in the exhaust conduit includes guiding a cutting tool through the passage defined by the mounting boss.

* * * * *